United States Patent [19]
Enders

[11] Patent Number: 6,126,192
[45] Date of Patent: Oct. 3, 2000

[54] NO FASTENERS SIDE AIR BAG MODULE

[75] Inventor: Mark L. Enders, Pleasant View, Utah

[73] Assignee: Autoliv ASP, Inc., Ogden, Utah

[21] Appl. No.: 09/266,089

[22] Filed: Mar. 10, 1999

[51] Int. Cl.[7] .................................................. B60R 21/16
[52] U.S. Cl. ..................................... 280/728.2; 280/730.2
[58] Field of Search ................................ 280/736, 743.1, 280/743.2, 728.2, 741, 730.2

[56] References Cited

U.S. PATENT DOCUMENTS

| | | |
|---|---|---|
| 5,354,093 | 10/1994 | Schenck et al. . |
| 5,474,323 | 12/1995 | Davidson . |
| 5,489,116 | 2/1996 | Boag . |
| 5,496,057 | 3/1996 | Niederman . |
| 5,636,859 | 6/1997 | Williams et al. . |
| 5,639,111 | 6/1997 | Spencer et al. . |
| 5,639,112 | 6/1997 | Phillion et al. . |
| 5,685,559 | 11/1997 | Cuevas . |
| 5,687,987 | 11/1997 | Spencer et al. ................ 280/728.2 |
| 5,687,988 | 11/1997 | Storey et al. .................. 280/728.2 |
| 5,803,486 | 9/1998 | Spencer et al. ................ 280/728.2 |
| 5,803,488 | 9/1998 | Bailey et al. . |
| 5,860,673 | 1/1999 | Hasegawa et al. . |
| 5,971,427 | 10/1999 | Whited et al. ................. 280/730.2 |

*Primary Examiner*—Paul N. Dickson
*Assistant Examiner*—Faye M. Fleming
*Attorney, Agent, or Firm*—Sally J. Brown

[57] ABSTRACT

An air bag safety system comprising an air bag cushion and a cylindrical-shaped inflator assembly connected to the air bag cushion. The inflator assembly is figured to rapidly fill the air bag cushion upon being actuated. The inflator assembly is attached to a base plate by an attachment assembly configured to attach the inflator assembly to the base plate without either applying force to the inflator assembly so as to deform the attachment assembly or applying heat to the inflator assembly. The attachment assembly comprises a tie strip and a retention mechanism configured to lock the tie strip in place to hold the inflator assembly on the base plate. The air bag safety system also includes a plurality of resilient mounting hooks configured to cooperate with either a frame member within the vehicle occupant compartment or an attachment piece mounted to the frame member, such that air bag safety system can be snapped in place. The air bag safety system also includes a heat shield attached to the base plate to protect the interior surface of said air bag cushion from the gases used to rapidly inflate the air brag cushion. A method of assembling the air bag safety system is also provided.

36 Claims, 3 Drawing Sheets

NO FASTENERS SIDE AIR BAG MODULE

BACKGROUND OF THE INVENTION

1. The Field of the Invention

The present invention relates to a safety device used particularly in motor vehicles which, upon the onset of a collision, deploys an inflatable restraint cushion, known as an air bag cushion, to protect the occupants of the vehicle from the impact of a collision. More particularly, this invention relates to an attachment assembly for mounting an inflator assembly to a base plate.

2. The Relevant Technology

An inflatable vehicle occupant restraint, such as an air bag system with an inflatable air bag cushion, is inflated to protect an occupant of a vehicle upon the occurrence of a vehicle collision. When the vehicle, usually an automobile, is involved, in a collision, a crash signal actuates an inflator assembly of the air bag system to cause an air bag cushion to deploy. Typically, an actuator triggers a chemical, pyrotechnic, or some other reaction in the inflator assembly. The inflator assembly then emits an inflation fluid or gas which is directed to flow into the air bag cushion. The inflation fluid or gas inflates the air bag cushion from an uninflated condition to an inflated condition in which the air bag cushion extends into the vehicle occupant compartment. When the air bag cushion is in the inflated condition, it restrains an occupant of the vehicle from forcefully striking components of the vehicle as a result of the collision.

Initially, air bag systems were positioned in the vehicle occupant compartment substantially in front of the occupant. Not every collision, however, occurs from the front. It is not uncommon for the collision to occur at an angle relative to the occupant or from the side. In an attempt to protect the occupant from collisions that may be from a direction other than the front, air bag systems are being positioned to protect the side of the vehicle occupant.

One difficulty encountered by an air bag system intended to protect the side of the vehicle occupant is that there is limited space available in which to install the air bag system. As a result, a side impact air bag system must be designed as small as possible. Typically, the air bag system is in modular form. In general, an air bag system, regardless of location, includes an air bag cushion, an inflator assembly, a base plate, and a cover. Within the module, there are various conventional methods for holding the inflator assembly in position to inflate the air bag cushion.

It is common to provide an air bag assembly in which the inflator is permanently connected to either a base plate or the container for the air bag cushion. In the alternative, the inflator assembly can be attached to the base plate using conventional attaching techniques such as riveting, welding and pressing fitting the inflator assembly to a structural member such as the base plate. As air bag systems have been reduced in size, however, particularly for the designs being used for side impact protection, mounting the inflator assembly to the base plate has become increasingly difficult. In part, the difficulty arises because of the decrease in size of the inflator assembly. In addition, the inflator assembly may have various configurations which add to the difficulty of attaching the inflator assembly. As the size of the air bag system has been reduced, one typical configuration for the inflator-assembly is an elongated and narrow cylindrical body.

Attaching the elongated and narrow cylinder-shaped inflator assembly to a base plate has presented a variety of manufacturing problems. In this configuration, it is very difficult to rivet the inflator assembly to the base plate. In addition, it is difficult to weld to a cylindrical-shaped object. Making a clean, defect free weld between a narrow round surface and a flat surface presents difficulty. Welds are also very problematic to inspect in this configuration of an inflator assembly with existing inspection techniques. As a result, an unacceptable probability exists that there may be defective welds that are not caught and as consequence may fail.

In addition to reducing the size of the air bag system, there has also been a movement to reduce the weight and cost of the air bag system itself. As a result, it is desirable to make as many of the components further of the air bag system out of plastic as possible. Unfortunately, the use of plastic components further limits the various types of manufacturing processes that can be utilized in assembling the air bag system. Often, metal attachment pieces must be included if it is desired to use a welding attachment technique.

Another concern is that the cylindrical-shaped inflator assembly must be capable of serving as a pressure vessel that contains the inflation fluid or gas that used inflate the air bag cushion. The United States Department of Transportation has regulations and there are generally accepted engineering standards with regard to pressure vessels. These standards and regulations do not recommend welding on the pressure vessel section.

Another problem that is presented as the size of the air bag system is reduced is that upon the inflator assembly being actuated, the pressurized and sometimes heated, inflation fluid may cause damage to the interior surface of the air bag cushion. This is particularly true in hybrid, pyrotechnic and even cold gas inflators which have a hot gas exiting the inflator during the first few milliseconds after actuation. The initial hot gas may result in the interior of the air bag cushion being scorched and even burned.

SUMMARY AND OBJECTS OF THE INVENTION

It is an object of the present invention to provide an air bag safety system that includes an inflator assembly and a base plate which are designed such that the inflator assembly can be attached to the base plate without either applying force to the inflator assembly so as to deform the connecting assembly or applying heat to the inflator assembly.

It is further an object of the present invention to provide an inflator assembly for an air bag safety system that is attached to the base plate in such a matter that it reduces any defects or unnecessary inspection.

It is yet another object of the present invention to provide an air bag safety system in which the inflator assembly and the base plate have been designed so that the inflator assembly can be attached to the base plate in a way that conforms with the recommendations of the Department of Transportation and generally accepted engineering standards.

It is another object of the present invention to provide an air bag system in modular form that can be snapped into place in the passenger compartment of the vehicle.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims.

To achieve the foregoing objects, and in accordance with the invention as embodied and broadly described herein, an air bag safety system is provided that comprises an air bag cushion and an elongated, cylindrical-shaped inflator assembly configured to rapidly fill the air bag cushion upon actuation. The inflator assembly is in communication with the air bag cushion and is mounted on an elongated base plate by an attachment assembly. The attachment assembly is configured to attach the inflator assembly to the base plate without either applying force to the inflator assembly so as to, deform the attachment assembly or applying heat to the inflator assembly. The attachment assembly comprises a resilient tie strip and a retention mechanism that is configured to lock the tie strip in place to hold the inflator assembly on the base plate. The retention mechanism includes a receiving body with a passageway formed therethrough and male and female connectors configured to cooperate so as to lock the tie strip in place in the receiving body. The male connector comprises ridges extending outwardly from the receiving body into the passageway and the female connector is a plurality of grooves formed in the tie strip.

The air bag safety system also includes a plurality of resilient mounting hooks configured to cooperate with either a frame member within the vehicle occupant compartment or an attachment piece mounted to the frame member such that the air bag safety system can be snapped into place. A heat shield is attached to the base plate to protect the interior of the air bag cushion from the gases used to rapidly inflate the air bag cushion.

A method of assembling the air bag safety system is also provided that includes the steps of providing a base plate and a cylindrical-shaped inflator assembly. The inflator assembly is mounted on the base plate using an attachment assembly configured to attach the inflator assembly to the base plate without either applying force to the inflator assembly so as to deform the attachment assembly or heat to the inflator assembly. The inflator assembly is mounted on the base plate by inserting the remote end of the tie strip into a passageway formed through a retention mechanism. The tie strip is pulled through the retention mechanism until the tie strip is tight against the inflator assembly. The tie strip is then locked in place. An uninflated air bag cushion is operably connected to the inflator assembly. The inflator assembly, base plate, and air bag cushion are disposed into the cover, thereby forming an air bag module. A plurality of resilient hooks are also disposed into one of either the frame member within the vehicle occupant compartment or an attachment piece mounted to the frame member to mount the air bag module. The module is then snapped into place.

BRIEF DESCRIPTION OF THE DRAWINGS

In order that the manner in which the above-recited and other advantages and objects of the invention are obtained, a more particular description of the invention briefly described above will be rendered by reference to a specific embodiment thereof which is illustrated in the appended drawings. Understanding that these drawing depict only a typical embodiment of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The present invention relates to an air bag safety system that includes a base plate upon which is mounted a cylindrical-shaped inflator assembly configured to rapidly fill an air bag cushion. The inflator assembly is mounted on the base plate by an attachment assembly that is designed to attach the cylindrical inflator assembly to the base plate without the use of conventional attaching methods such as welding, metal mounts, press fitting, or riveting.

Figure 1:
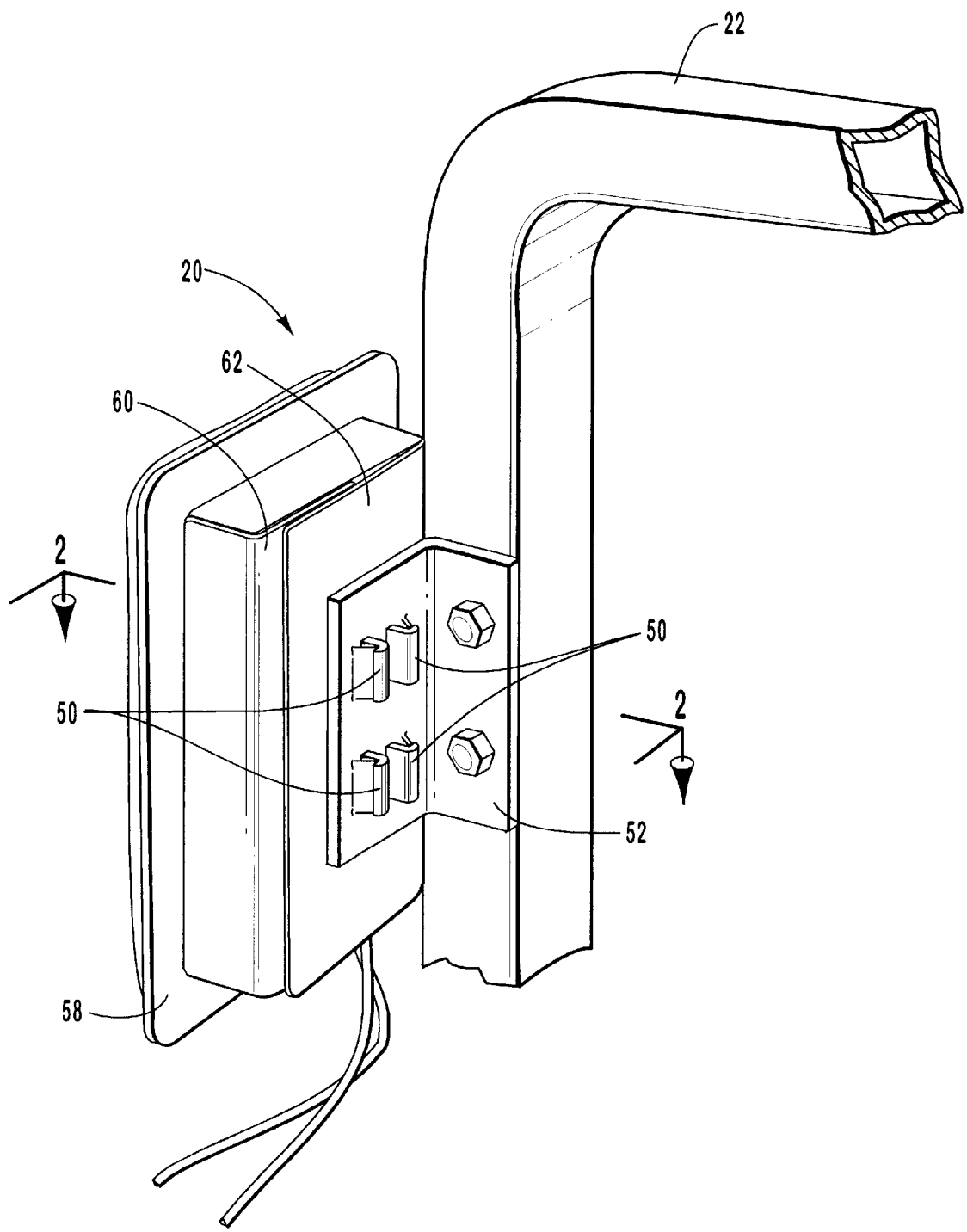
FIG. 1 is a perspective view of one embodiment of an air bag safety system mounted on a frame member.

FIG. 1 illustrates one embodiment of an air bag safety system, such as air bag safety system 20, connected to a frame member, such as frame member 22, within a vehicle occupant compartment. As depicted, in one embodiment frame member 22 is the frame of a seat. In this embodiment, air bag safety system 20 is positioned to protect the occupant against a side impact. It can be appreciated by those skilled in the art, however, that air bag safety system 20 described herein could be used as a conventional front air bag safety system on either the driver's side or passenger's side or as an air bag safety system positioned in other spots within the vehicle occupant compartment. As a result, frame member. 22 may be various other structural members of the vehicle within the vehicle occupant compartment.

Figure 2:
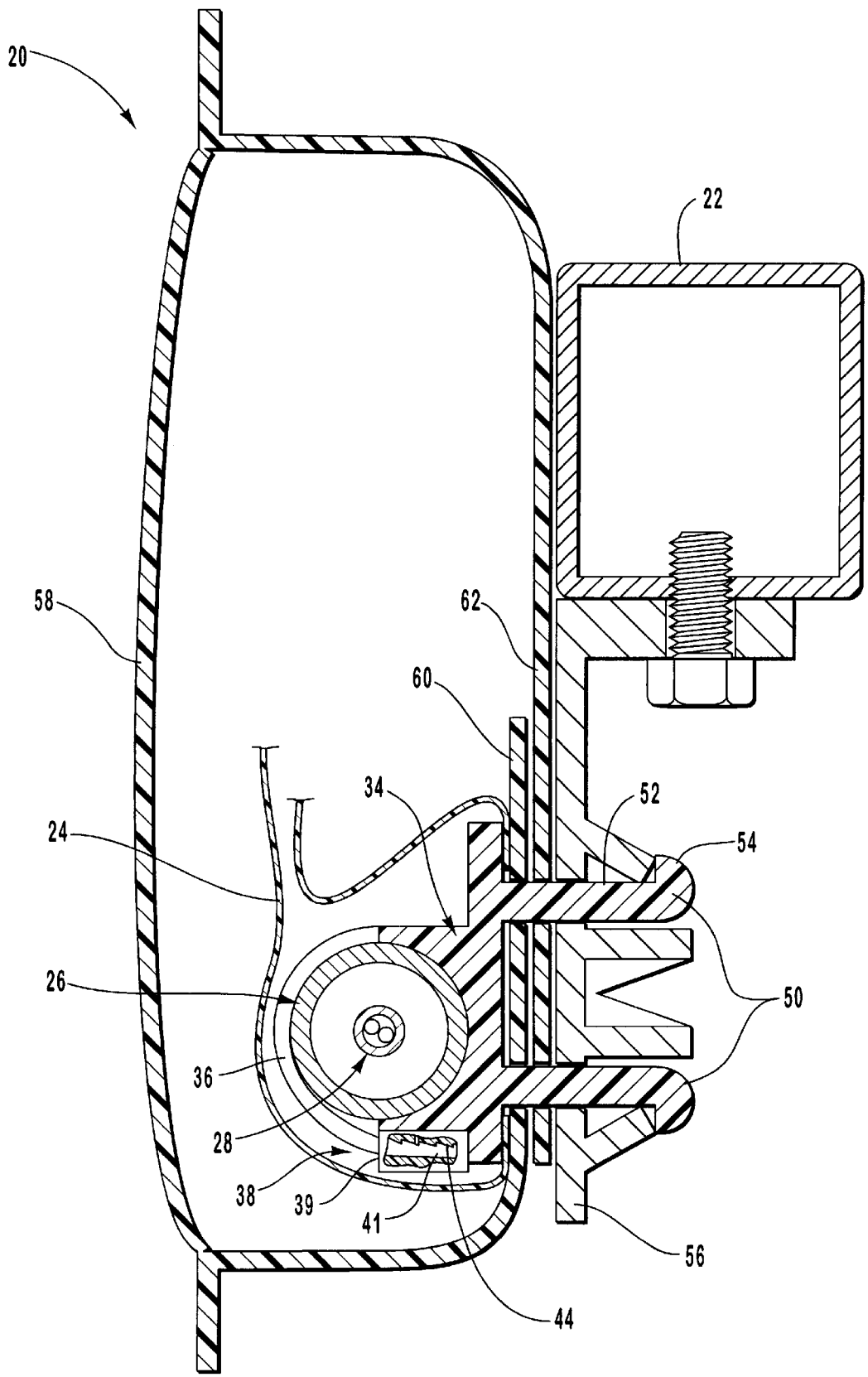
FIG. 2 is a partial cross-sectional view of the structure of FIG. 1.

Air bag safety system 20 is illustrated in further detail in FIG. 2 and comprises an air bag cushion 24, an inflator assembly 26, and a base plate 34. Inflator assembly 26 is configured to inflate air bag cushion 24 upon being actuated by a signal that is sent to air bag safety system 20 at the onset of a collision. One embodiment of inflator assembly 26, depicted in FIGS. 2 and 3, has a substantially narrow and elongated, cylindrical shape. Inflator assembly 26 typically contains a gas generating material or pressurized gas therein that upon actuation of inflator assembly 26 is released to rapidly fill and deploy air bag cushion 24.

Inflator assembly 26 includes an actuator assembly 28 that is mounted proximate to one end of inflator assembly 26. Actuator assembly 28 is operatively connected to the vehicle and upon receipt of a signal that a collision has occurred actuates inflator assembly 26. Inflator assembly 26 also includes a diffuser assembly 30, shown in FIG. 3, which directs the pressurized gas exiting inflator assembly 26 into the interior of the air bag cushion (FIG. 2). Diffuser assembly 30 has several apertures 32 formed therein to direct the pressurized gas leaving inflator assembly 26 into air bag cushion 24 upon air bag safety system 20 being actuated by actuator assembly 28.

Inflator assembly 26 is one embodiment of structure capable of performing the function of an inflator means for inflating air bag cushion 24. It can be appreciated that various other configurations and conventional types of inflator assemblies 26 with actuator assemblies 28 and diffuser assemblies 30 therein can be utilized in the present invention. While the present invention is particularly useful with an elongated, cylindrical-shaped inflator assembly 26, inflator assembly 26 may have various other shapes. For example and without limitation, inflator assembly 26 could be oval, square, circular, rectangular, or combinations thereof. Further, inflator assembly 26 is not required to be elongated and may be shorter in length.

Figure 3:
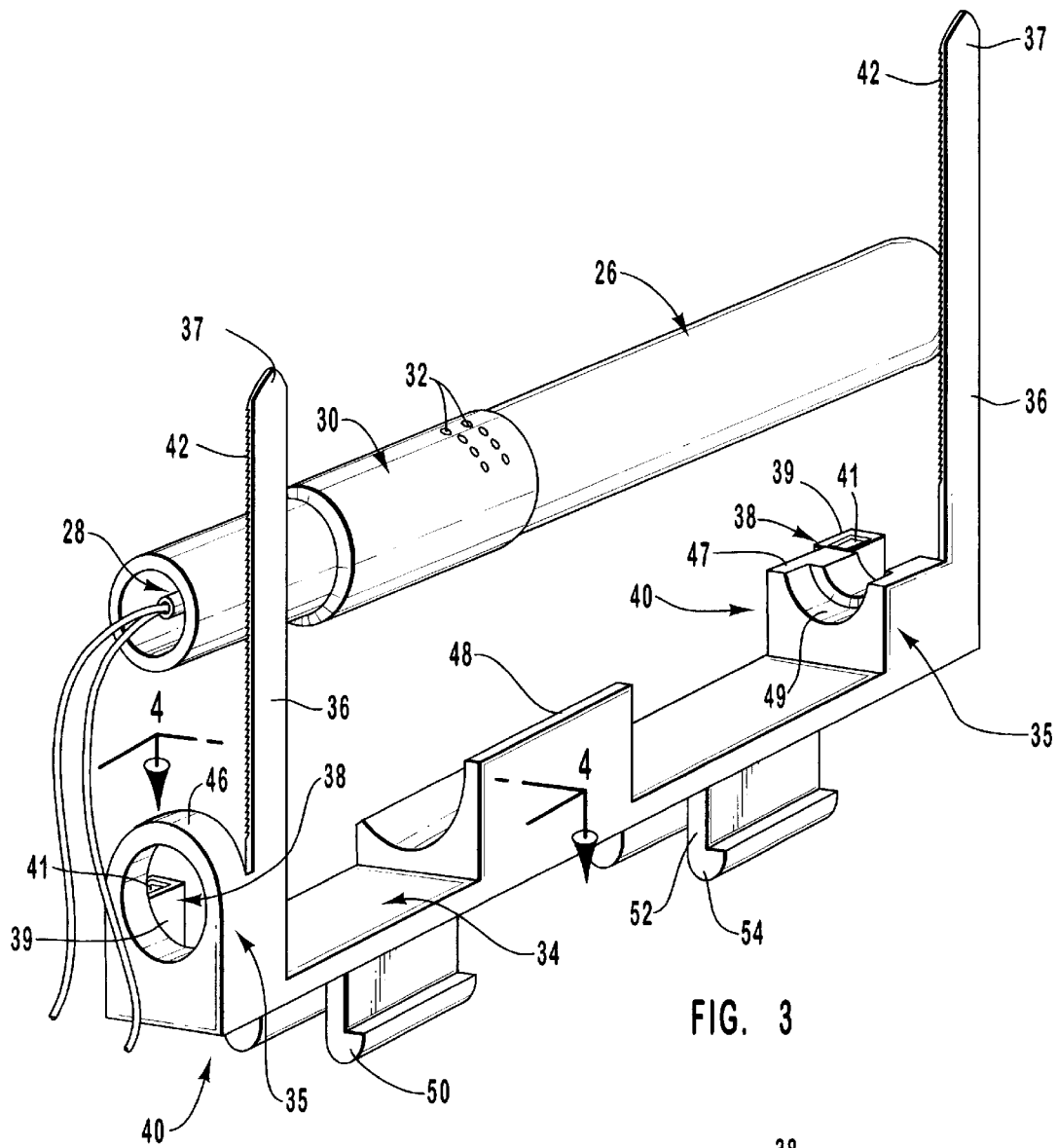
FIG. 3 is an exploded perspective view of one embodiment of an inflator assembly and one embodiment of a base plate.

Also depicted in FIGS. 2 and 3 is one embodiment of a base plate 34. Base plate 34 is an elongated member that is sized and configured to cooperate with inflator assembly 26 such that inflator assembly 26 can be mounted on base plate 34. According to one aspect of the present invention, base plate 34 includes an attachment assembly 35 configured to attach inflator assembly 26 to base plate 34 without either applying force to inflator assembly 26 so as to deform attachment assembly 35 or applying heat to inflator assembly 26. Referring to FIG. 3, one embodiment of attachment assembly 35 includes a tie strip 36 and a retaining mechanism 38. Tie strips 36 are elongated resilient members that can be bent to contact inflator assembly 26 so as to hold inflator assembly 26 in a fixed position on base plate 34.

Figure 4:
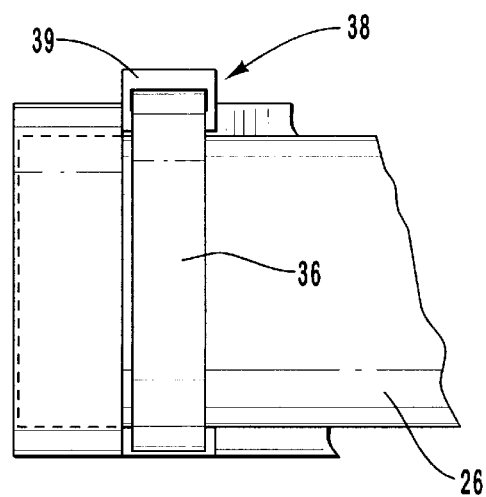
FIG. 4 is a partial top elevation view of a portion of the structure of FIG. 3 in which the inflator assembly is mounted to the base plate.

Inflator assembly 26 is selectively attached to base plate 34 by inserting tie strips into retaining mechanism 38 and pulling tie strips 36 through retaining mechanism 38 until tie strips 36 firmly hold inflator assembly 26 against base plate 34. Retaining mechanism 38 is adapted to hold remote end 37 of tie strip 36 in place once tie strip 36 has been snugged against inflator assembly 26 as depicted in FIG. 4.

Referring to FIG. 2, according to one aspect of the present invention, retaining mechanism 38 comprises a receiving body 39 and male and female connectors sized and configured so as to lock remote end 37 of tie strips 36 in place within receiving body 39. As illustrated, receiving body 39 is sized and configured to receive the remote end 37 of tie strip 36 therein. In one embodiment of receiving body 39 depicted in FIGS. 2–4, receiving body 39 is substantially rectangular-shaped. Receiving body 39 could, however, have various other configuration and perform the function thereof. Receiving body 39 has a passageway 41 formed therein configured to receive tie strip 36. Passageway 41 and tie strip 36 are configured to cooperate together.

One embodiment of male and female connectors of retaining mechanism 38 are depicted in FIGS. 2 and 3. As illustrated in FIG. 3, one embodiment of female connectors are a series of grooves 42 formed on one side of tie strip 36 adjacent to inflator assembly 26. Grooves 42 are substantially perpendicular to the longitudinal axis of tie strips 36. The series of grooves 42 allows attachment assembly 35 to be used with inflator assemblies 26 of various sizes and diameters. Various other embodiments of female connectors are able to perform the function thereof By way of example and not limitation, the female connectors could be in the form of a series of holes or recesses formed in tie strip 36 configured to receive male connectors therein.

FIG. 2 also depicts one embodiment of male connectors as ridges 44. Ridges 44 extend outwardly from receiving body 39 into passageway 41. Grooves 42 and ridges 44 are sized and configured to cooperate so as to selectively, mechanically lock remote end 37 of tie strip 36 in place in passageway 41 of receiving body 39, thereby attaching inflator assembly 26 to base plate 34. It can be appreciated that grooves 42 could be formed on the opposite surface of tie strip 36. As a result, the position of ridges 44 in receiving body 39 would be reversed. It can also be appreciated that instead of the embodiment illustrated, the positions of grooves 42 and ridges 44 could be switched. In that case, tie strips 36 would have ridges 44 formed thereon and groove 42 formed in receiving body 39. Retaining mechanism 38 is one embodiment of structure capable of performing the function of a retaining means for locking tie strip 36 in place against inflator assembly 26 without the use of heat or force. The male connectors could have various other configurations. For example, the male connectors could be a raised protuberance sized and configured to be received in a female connector such as an aperture or recess.

Attachment assembly 35 also includes positioning structure 40 on base plate 34 that is sized and configured to receive inflator assembly 26 thereon. -Positioning structure 40 makes it easier for air bag safety system 20 to be correctly and efficiently assembled. One embodiment of positioning structure 40 depicted in FIG. 3 comprises a first positioning structure 46 located on one end of base plate 34 and a second positioning structure 47 located on the opposite end of base plate 34. As illustrated, first positioning structure 46 is a substantially circular-shaped structure with an opening formed therein adapted to receive one end of inflator assembly 26. Various other configurations and shapes of first positioning structure 46 may perform the function thereof equally effectively. First positioning structure 46 may have any configuration as long as the opening formed therein is sized and configured to cooperate with and receive a portion of one end of inflator assembly 26.

Second positioning structure 47 is configured such that an open channel 49 is formed thereon to cradle inflator assembly 26. Although not the presently preferred embodiment, first positioning structure 46 could instead of having an opening formed therein that completely encloses a portion of one end of inflator assembly 26 as illustrated in FIG. 3, be shaped the same as second positioning structure 47. In that case, first positioning structure 46 would have open channel 49 that cradles inflator assembly 26. One of the advantages of first positioning structure 46 being configured as depicted in FIG. 3, is that as a non-flexible structural member of base plate 34, first positioning structure 46 reduces any stresses that must be resisted by tie strips 36. Attachment assembly 35 is one embodiment of structure capable of performing the function of a connecting means for attaching, without the application of heat or force, inflator assembly 26 to base plate 34.

In one embodiment, base plate 34, positioning structure 40, and attachment assembly 35 are substantially composed of a light weight, resilient material, such as plastic. The plastic material must have such characteristics as to allow tie strips 36 to be flexible, resilient members, but having sufficient strength to hold inflator assembly 26 onto base plate 34.

According to another aspect of the present invention, base plate 34 includes a heat shield 48 configured to protect the interior of air bag cushion 24 from the pressurized gases exiting inflator assembly 26 upon actuation. Additionally, in some cases extremely hot gases exit diffuser assembly 30 through diffuser apertures 32 for a millisecond upon actuation. As depicted in FIG. 3, one embodiment of heat shield 48 extends upwardly from base plate 34 toward inflator assembly 26. The surface of heat shield 48 that is proximate to inflator assembly 26 is configured to cooperate with inflator assembly 26 Heat shield 48 is sized and configured such that it is positioned in line with diffuser apertures 32 formed in diffuser assembly 30. As a result hot and/or pressurized gases exiting diffuser assembly 30 through diffuser apertures 32 contact heat shield 48 prior to going into air bag cushion 24. In such cases, heat shield 48 also protects the interior surface of air bag cushion 24 thereby reducing and even eliminating any burning or scorching of air bag cushion 24 as a result of the hot and/or pressurized gases exiting diffuser assembly 30.

Heat shield 48 is one example of structure capable of performing the function of shielding means for protecting the interior of air bag cushion 24 from the gases exiting inflator assembly 26 upon actuation. Heat shield 48 could have various other shapes and configurations. The important aspect of heat shield 48 is that it be sized and positioned proximate to diffuser apertures 32 of inflator assembly 26 so that gases exiting inflator assembly 26 impact upon heat shield 48 rather than the interior surface of air bag cushion 24. Heat shield 48 may be composed of various heat resistant materials such as plastic or nylon. A presently preferred embodiment of heat shield 48 comprises a plastic material.

According to another aspect of the present invention, base plate 34 also comprises resilient mounting hooks 50 depicted in FIGS. 1–3. Mounting hooks 50 are configured to mount air bag safety system 20 typically in modular form within a vehicle occupant compartment. Referring to FIGS. 2 and 3, resilient mounting hooks 50 each comprise a shank 52 and an enlarged head 54 configured to cooperate with an optional mounting piece 56 or directly with frame member 22 when air bag safety system 20 is mounted within the vehicle occupant compartment. Resilient mounting hooks 50 are sized and configured to cooperate with optional mounting piece 56 or frame member 22 such that air bag safety system 20 can be snapped into place as a module. Resilient mounting hooks 50 are composed of a resilient material such as plastic. Mounting hooks 50 are one embodiment of structure capable of performing the function of a mounting means for mounting air bag safety system 20 within a vehicle occupant compartment. It can be appreciated that mounting hooks 50 could have various other configurations. For example, mounting hooks 50 could be pointed like an arrow head. In the alternative, mounting hooks 50 could have rounded oversized heads or be L-shaped.

Air bag safety system 20 also includes a cover 58 configured to confine air bag cushion 24 therein as depicted in FIGS. 1 and 2. Cover 58 encloses air bag cushion 24, inflator assembly 26, and base plate 34. In one embodiment, cover 58 is formed as a resilient, substantially one piece member that is configured to receive air bag cushion 24, inflator assembly 26 and base plate 34 therein and to wrap around them such that cover 58 completely encloses air bag cushion 24, inflator assembly 26 and base plate 34. Cover 58 comprises first and second flaps 60 and 62, respectively. First and second flaps 60, 62 have openings formed therein sized and configured to cooperate with resilient mounting hooks 50. In addition, one edge of cover 58 has a hole (not shown) formed there in so as to cooperate with actuator assembly 28 disposed in inflator assembly 26. Cover 58 is one example of structure capable of performing the function of such a cover means for confining air bag cushion 24 therein It can be appreciated that cover 58 may have various other configurations. By way of example and not limitation, cover 58 may be a two-piece member that encloses air bag cushion 24, inflator assembly 26 and base plate 34. Alternatively, instead of first and second flaps 60 and 62, cover 58 may have only one flap or a separate back piece.

As illustrated in FIGS. 1 and 2, once inflator assembly 26 is attached to base plate 34 by attachment assembly 35, air bag cushion 24 is operably connected to inflator assembly 26. Inflator assembly 26, base plate 34, and air bag cushion 24 are then disposed in cover 58. First and second flaps 60 and 62, respectively, of cover 58 are then bent to enclose base plate 34, inflator assembly 26, and air bag cushion 24 therein such that resilient mounting hooks 50 are aligned with the openings formed in first and second flaps 60 and 62 respectively. As a result, mounting hooks 50 can extend outside of cover 58. Air bag safety system 20 is now in a modular form.

Resilient mounting hooks 50 are positioned such that they can cooperate with an optional mounting piece 56 or frame member 22. In the embodiment depicted in the figures, four resilient mounting hooks 50 are utilized. It can be appreciated by those skilled in the art that various other numbers of resilient mounting hooks can be used to mount air bag safety system 20 to the vehicle. Resilient mounting hooks are disposed in either frame member or attachment piece by snapping the modular air bag system into place.

Depending on the characteristics of the material, it is contemplated that base plate 34 with attachment assembly 35, positioning structure 40, heat shield 48, and mounting hooks 50 can be a one piece member composed of a plastic material.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. An air bag safety system comprising:
    (a) a base plate;
    (b) an air bag cushion;
    (c) a cylindrical-shaped inflator assembly in communication with said air bag cushion, said inflator assembly being configured to rapidly fill said air bag cushion upon actuation; and
    (d) an attachment assembly configured to attach said inflator assembly to said base plate, said attachment assembly being configured such that said inflator assembly is attached to said base plate without either applying force to said inflator assembly so as to deform said attachment assembly or applying beat to said inflator assembly,
    said attachment assembly having,
        a resilient tie strip attached to said base plate, and
        retaining means for locking said tie strip in place to hold said inflator assembly on said base plate, said retaining means having,
            a receiving body having a passageway formed therethrough,
            a male connector attached to said receiving body, said male connector comprising ridges extending outwardly from said receiving body into said passageway, and said male connector being at least partially disposed in said passageway of said receiving body, and
            a female connector comprising a plurality of grooves formed in said tie strip, said grooves being substantially perpendicular to the longitudinal axis of said tie strip, said female connector configured to cooperate with said male connector so as to lock said tie strip in place in said passageway of said receiving body, thereby attaching said inflator assembly to said base plate.

2. An air bag safety system as recited in claim 1, wherein said attachment assembly is integral to said base plate.

3. An air bag safety system as recited in claim 1, further comprising mounting means for mounting air bag safety system to a frame member within a vehicle occupant compartment.

4. An air bag safety system as recited in claim 3, wherein said mounting means comprises a plurality of resilient mounting hooks configured to cooperate with one of either the frame member within the vehicle occupant compartment or an attachment piece mounted to the frame member such that air bag safety system can be snapped in place.

5. An air bag safety system as recited in claim 1, further comprising a heat shield attached to said base plate, said heat shield being configured to protect the interior of said air bag cushion during the rapid filling of said air bag cushion.

6. An air bag system comprising:
 (a) an elongated base plate;
 (b) an air bag cushion;
 (c) an elongated, cylindrical-shaped inflator assembly attached to said air bag cushion, said inflator assembly being configured to rapidly fill said air bag cushion with a pressurized gas; and
 (d) an attachment assembly configured to attach said inflator assembly to said base plate, said attachment assembly being configured such that said inflator assembly is attached to said base plate without either applying force to said inflator assembly so as to deform said attachment assembly or applying heat to said inflator assembly; said attachment assembly comprises a resilient tie strip attached to said base plate and a retention mechanism attached to said base plate and configured to lock said tie strip in place to hold said inflator assembly on said base plate,
 said retention mechanism having,
  a receiving body having a passageway formed therethrough,
  a ridge attached to said receiving body, said ridge extending outwardly from said receiving body into said passageway, and
  a groove formed on said tie strip and configured to cooperate with said ridge, so as to lock said tie strip in said passageway of said receiving body, thereby attaching said inflator assembly to said base plate.

7. An air bag safety system as recited in claim 6, further comprising a cover removably attached to said base plate, said cover being sized and configured so as to enclose said air bag cushion and said inflator assembly therein.

8. An air bag safety system as recited in claim 7, further comprising a mounting assembly configured to mount the air bag safety system within a vehicle occupant compartment.

9. An air bag safety system as recited in claim 8, wherein said mounting assembly comprises a plurality of resilient mounting hooks configured to cooperate with one of either a frame member within the vehicle occupant compartment or an attachment piece mounted to the frame member.

10. An air bag safety system as recited in claim 9, wherein said cover has a plurality of openings formed therein configured to cooperate with said plurality of resilient mounting hooks such that upon said cover being attached to said base plate said resilient mounting hooks extend outwardly through said cover so as to allow the air bag safety system to be can be snapped into place in the vehicle occupant compartment.

11. An air bag safety system as recited in claim 6, further comprising a heat shield extending upwardly from said base plate toward said inflator assembly, said heat shield being sized and configured so as to protect the interior of said air bag cushion from said gas released by said inflator assembly to rapidly fill said air bag cushion.

12. A method for assembling an air bag safety system comprising the steps of:
 (a) providing a base plate;
 (b) providing a cylindrical-shaped inflator assembly to be attached to said base plate; and
 (c) mounting said inflator assembly, on said base plate using an attachment assembly configured so that said inflator assembly is attached to said base plate without either applying force to said inflating means so as to deform said attachment assembly or applying heat to said inflator assembly, wherein mounting said inflator assembly includes,
  inserting the remote end of a resilient tie strip into a passageway formed through a retention mechanism,
  pulling said tie strip through said retention mechanism until said tie strip is tight against said inflating assembly, and
  locking said tie strip in place.

13. A method for assembling an air bag safety system as recited in claim 12, further comprising the steps of operably connecting an air bag cushion to said inflator assembly.

14. A method for assembling an air bag safety system as recited in claim 12, further comprising the steps of disposing said inflator assembly, said base plate, and said air bag cushion into a cover, thereby forming an air bag module.

15. A method for assembling an air bag safety system as recited in claim 14, further comprising the steps of mounting said air bag module in the passenger compartment of a vehicle using a mounting means for mounting the air bag safety system to one of either a frame member within a vehicle occupant compartment or an attachment piece mounted to the frame member within a vehicle occupant compartment, said mounting means comprises a plurality of resilient mounting hooks configured to cooperate with one of either said frame member within the vehicle occupant compartment or said attachment piece mounted to said frame member.

16. A method for assembling an air bag safety system as recited in claim 15, wherein said step of mounting said air bag module further comprises the steps of disposing said plurality of resilient mounting hooks into one of either said frame member within the vehicle occupant compartment or said attachment piece mounted to the frame member.

17. A method for assembling an air bag safety system as recited in claim 16, wherein said step of mounting said air bag module farther comprises snapping said air bag module into place.

18. An air bag safety system comprising:
 an air bag cushion;
 an inflator assembly in communication with the air bag cushion and configured to rapidly fill said air bag upon actuation;
 an elongated base plate;
 an attachment assembly disposed on the base plate and configured to secure the inflator assembly to the base plate, the attachment assembly having,
  two resilient tie strips attached to the base plate, and
  two retention mechanisms configured to engage and lock a corresponding tie strip.

19. The air bag system of claim 18, wherein the two tie strips are disposed proximate to opposing ends of the base plate.

20. The air bag system of claim 18, further comprising a first positioning structure configured in a circular shape and disposed on an end of the base plate, the first positioning structure having an opening disposed therein to receive an end of the inflator assembly.

21. The air bag system of claim 20, further comprising a second positioning structure disposed on an opposing end of the base plate, the second positioning structure having an open channel to receive an opposing end of the inflator assembly.

22. The air bag system of claim 18, further comprising a heat shield attached to the base plate and configured to extend from the base plate to prevent contact of the inflator assembly with the base plate.

23. The air bag system of claim 18, wherein each retention mechanism comprises,
   a receiving body having a passageway formed therethrough,
   a ridge attached to the receiving body, the ridge extending outwardly from the receiving body into the passageway, and
   a groove formed on a corresponding tie strip and configured to cooperate with the ridge, so as to lock the tie strip in the passageway of the receiving body.

24. The air bag system of claim 18, further comprising a cover removably attached to the base plate, the cover configured to enclose the air bag cushion and the inflator assembly therein.

25. The air bag system of claim 18, further comprising a mounting assembly configured to mount the air bag system within a vehicle compartment.

26. The air bag system of claim 25, wherein the mounting assembly comprises a plurality of resilient mounting hooks.

27. The air bag system of claim 26, wherein the cover comprises a plurality of openings formed therein and configured to cooperate with the plurality of mounting hooks such that upon the cover being attached to the base plate the mounting hooks extend outwardly through the cover.

28. The air bag system of claim 18, wherein the attachment assembly is integral to the base plate.

29. The air bag system of claim 18, wherein each retention mechanism comprises:
   a receiving body having a passageway formed therethrough,
   a male connector attached to the receiving body, the male connector being at least partially disposed in the passageway of the receiving body, and
   a female connector configured to cooperate with the male connector so as to lock a corresponding tie strip in place in the passageway of the receiving body.

30. An air bag safety system comprising:
   an air bag cushion;
   an inflator assembly in communication with the air bag cushion and configured to rapidly fill said air bag upon actuation;
   an elongated base plate;
   an attachment assembly disposed on the base plate and configured to secure the inflator assembly to the base plate, the attachment assembly having,
      a resilient tie strip attached to the base plate,
      a retention mechanism configured to engage and lock the tie strip, and
      a first positioning structure configured in a circular shape and disposed on an end of the base plate, the first positioning structure having a circular opening disposed therein to receive an end of the inflator assembly.

31. The air bag system of claim 30, further comprising a second positioning structure disposed on an opposing end of the base plate, the second positioning structure having an open channel to receive an opposing end of the inflator assembly.

32. The air bag system of claim 30, further comprising a heat shield attached to the base plate and configured to extend from the base plate to prevent contact of the inflator assembly with the base plate.

33. The air bag system of claim 30, wherein the retention mechanism comprises,
   a receiving body having a passageway formed therethrough,
   a ridge attached to the receiving body, the ridge extending outwardly from the receiving body into the passageway, and
   a groove formed on the tie strip and configured to cooperate with the ridge, so as to lock the tie strip in the passageway of the receiving body.

34. The air bag system of claim 30, further comprising a cover removably attached to the base plate, the cover configured to enclose the air bag cushion and the inflator assembly therein.

35. The air bag system of claim 30, further comprising a mounting assembly configured to mount the air bag system within a vehicle compartment.

36. The air bag system of claim 35, wherein the mounting assembly comprises a plurality of resilient mounting hooks.

\* \* \* \* \*